United States Patent
Hsiao et al.

(10) Patent No.: US 9,547,363 B2
(45) Date of Patent: Jan. 17, 2017

(54) POWER-SAVING METHOD AND ASSOCIATED ELECTRONIC DEVICE

(71) Applicant: MediaTek Inc., Hsin-Chu (TW)

(72) Inventors: Chih-Hsiang Hsiao, Taipei (TW); Chi-Hsuan Lin, New Taipei (TW); Po-Yu Chen, Hsinchu (TW)

(73) Assignee: MEDIATEK INC., Hsin-Chu (TW)

(*) Notice: Subject to any disclaimer, the term of this patent is extended or adjusted under 35 U.S.C. 154(b) by 0 days.

(21) Appl. No.: 14/748,409

(22) Filed: Jun. 24, 2015

(65) Prior Publication Data

US 2016/0018879 A1    Jan. 21, 2016

Related U.S. Application Data

(63) Continuation-in-part of application No. 14/332,628, filed on Jul. 16, 2014.

(Continued)

(51) Int. Cl.
*G06F 1/32* (2006.01)
*G06F 1/16* (2006.01)
(Continued)

(52) U.S. Cl.
CPC ............. *G06F 1/3287* (2013.01); *G06F 1/163* (2013.01); *G06F 1/3206* (2013.01); *G06F 1/3209* (2013.01); *G06F 1/3212* (2013.01); *G06F 1/3215* (2013.01); *G06F 1/3234* (2013.01); *H04W 52/028* (2013.01);
(Continued)

(58) Field of Classification Search
None
See application file for complete search history.

(56) References Cited

U.S. PATENT DOCUMENTS

2005/0253828 A1    11/2005    Jeong
2006/0025118 A1    2/2006    Chitrapu et al.
(Continued)

FOREIGN PATENT DOCUMENTS

EP    2 782 397    9/2014
WO    WO 2015/127056    8/2015

OTHER PUBLICATIONS

Hao, T., et al.; "ESMO an Energy-Efficient Mobile Node Scheduling Scheme for Sound Sensing;" IEICE Trans. Commun.; vol. E93-B; No. 11; Nov. 2010; pp. 2912-2934.
Hemminki, S., et al.; "Poster Abstract CoSense—A Collaborative Sensing Platform for Mobile Devices;" pp. 1-2.

*Primary Examiner* — Leon-Viet Nguyen
(74) *Attorney, Agent, or Firm* — McClure, Qualey & Rodack, LLP

(57) ABSTRACT

A power-saving method and associated electronic device are provided. The electronic device is connected with a first external electronic device and a second external electronic device, and a first sensor and a second sensor are deployed on the first external electronic device and the second electronic device, respectively. The electronic device includes: a third sensor, and a processor, wherein the first, second, and third sensors have the same type. The processor gathers information from the first pedometer sensor, the second pedometer sensor, the first external electronic device, and the second external electronic device, and determines whether to turn off at least one of the first, second, and third pedometer sensors according to the information gathered.

19 Claims, 16 Drawing Sheets

Related U.S. Application Data

(60) Provisional application No. 62/096,739, filed on Dec. 24, 2014.

(51) Int. Cl.
 *H04W 52/02* (2009.01)
 *G01C 22/00* (2006.01)
 *G06F 19/00* (2011.01)

(52) U.S. Cl.
 CPC ... *H04W 52/0254* (2013.01); *H04W 52/0277* (2013.01); *G01C 22/006* (2013.01); *G06F 1/325* (2013.01); *G06F 19/3481* (2013.01); *H04W 52/0251* (2013.01); *H04W 52/0264* (2013.01); *Y02B 60/1282* (2013.01); *Y02B 60/1292* (2013.01); *Y02B 60/50* (2013.01)

(56) References Cited

U.S. PATENT DOCUMENTS

| | | |
|---|---|---|
| 2010/0033424 A1 | 2/2010 | Kabasawa et al. |
| 2010/0063779 A1* | 3/2010 | Schrock .............. A43B 3/00 702/188 |
| 2011/0106954 A1 | 5/2011 | Chatterjee et al. |
| 2012/0284449 A1 | 11/2012 | Tung et al. |
| 2013/0106603 A1* | 5/2013 | Weast ................ G06F 1/163 340/539.11 |
| 2015/0156030 A1* | 6/2015 | Fadell ............... H04L 12/2816 700/90 |
| 2015/0188988 A1 | 7/2015 | Mei |
| 2016/0003623 A1 | 1/2016 | Venkatraman et al. |

* cited by examiner

POWER-SAVING METHOD AND ASSOCIATED ELECTRONIC DEVICE

CROSS REFERENCE TO RELATED APPLICATIONS

This application is a Continuation-In-Part of application Ser. No. 14/332,628, filed on Jul. 16, 2014 and entitled "REMOTE SENSOR DATA SHARING FOR ELECTRONIC DEVICE AND ASSOCIATED METHOD", and also claims the benefit of U.S. Provisional Application No. 62/096,739, filed on Dec. 24, 2014, the entirety of which are incorporated by reference herein.

BACKGROUND OF THE INVENTION

Field of the Invention

The invention relates to an electronic device, and, in particular, to a power-saving method and associated electronic device capable of turning off unnecessary sensors on other electronic devices to save power.

Description of the Related Art

Wearable devices, such as watches or other wrist-worn devices, are by their nature relatively small in size, and may be less than 40 mm in diameter. A wearable electronic device with multiple functions such as data display, email, text messaging, and wireless communication requires interact with the device to input data, scroll through software menus, etc. Due to the very limited battery capacity of the wearable device, it is a big challenge to reduce the power consumption of the wearable device.

In addition, a user may carry his portable device (e.g. a smartphone) and other wearable devices (e.g. a smart watch or a smart wristband) together. These devices may have the same type of sensors, such as pedometer sensors or location sensors. Since these devices are being carried by the same user, the sensors of different devices may gather similar sensor data. In other words, some of the gathered sensor data are redundant. Accordingly, there is demand for a power-saving method and an associated electronic device to solve the aforementioned issue.

BRIEF SUMMARY OF THE INVENTION

A detailed description is given in the following embodiments with reference to the accompanying drawings.

An electronic device is provided. The electronic device is connected with a first external electronic device and a second external electronic device, and a first sensor and a second sensor are deployed on the first external electronic device and the second electronic device, respectively. The electronic device includes: a third sensor, and a processor, wherein the first, second, and third sensors have the same type. The processor gathers information from the first pedometer sensor, the second pedometer sensor, the first external electronic device, and the second external electronic device, and determines whether to turn off at least one of the first, second, and third pedometer sensors according to the information gathered.

A power-saving method for use in an electronic device is provided. The method includes the steps of: connecting the electronic device with a first external electronic device and a second external electronic device, wherein t a first sensor and a second sensor are deployed on the first external electronic device and the second electronic device, respectively; utilizing a third sensor deployed on the electronic device to gather sensor data from the electronic device, wherein the first, second, and third sensors have the same type; gathering information from the first sensor and the second sensor, the first external electronic device, and the second external electronic device; and determining to turn off at least one of the first, second, and third sensors according to the information gathered.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
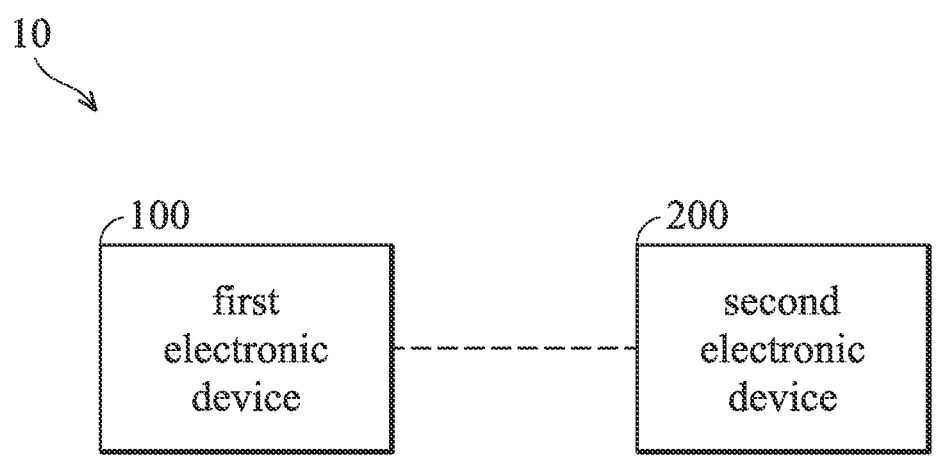
FIG. 1 is a block diagram of an electronic system in accordance with an embodiment of the invention.

FIG. 1 is a block diagram of an electronic system 10 in accordance with an embodiment of the invention. The electronic system 10 comprises a first electronic device 100 and a second electronic device 200. The first electronic device 100 and the second electronic 200 may connect to each other via a wireless communication protocol, e.g. via Bluetooth low energy (BLE) or near field communication (NFC), and have the same or similar applications installed. For example, the first electronic device 100 and the second electronic device 200 may utilize NFC or BLE to complete the steps of enabling, pairing and establishing a connection when sharing the sensor data. The first electronic device 100 may possess a rich battery capacity such as a smartphone, or a tablet PC, etc. The second electronic device 200 may possess a very limited battery capacity (i.e. compared with the first electronic device 100) such as a smart watch, a smart wristband, smart glasses, or any other type of wearable devices. Alternatively, the first electronic device 100 and the second electronic device 200 may be any type of mobile device, portable device, and/or wearable device, and the battery capacity of the first electronic device 100 is greater than that of the second electronic device 200.

Figure 2:
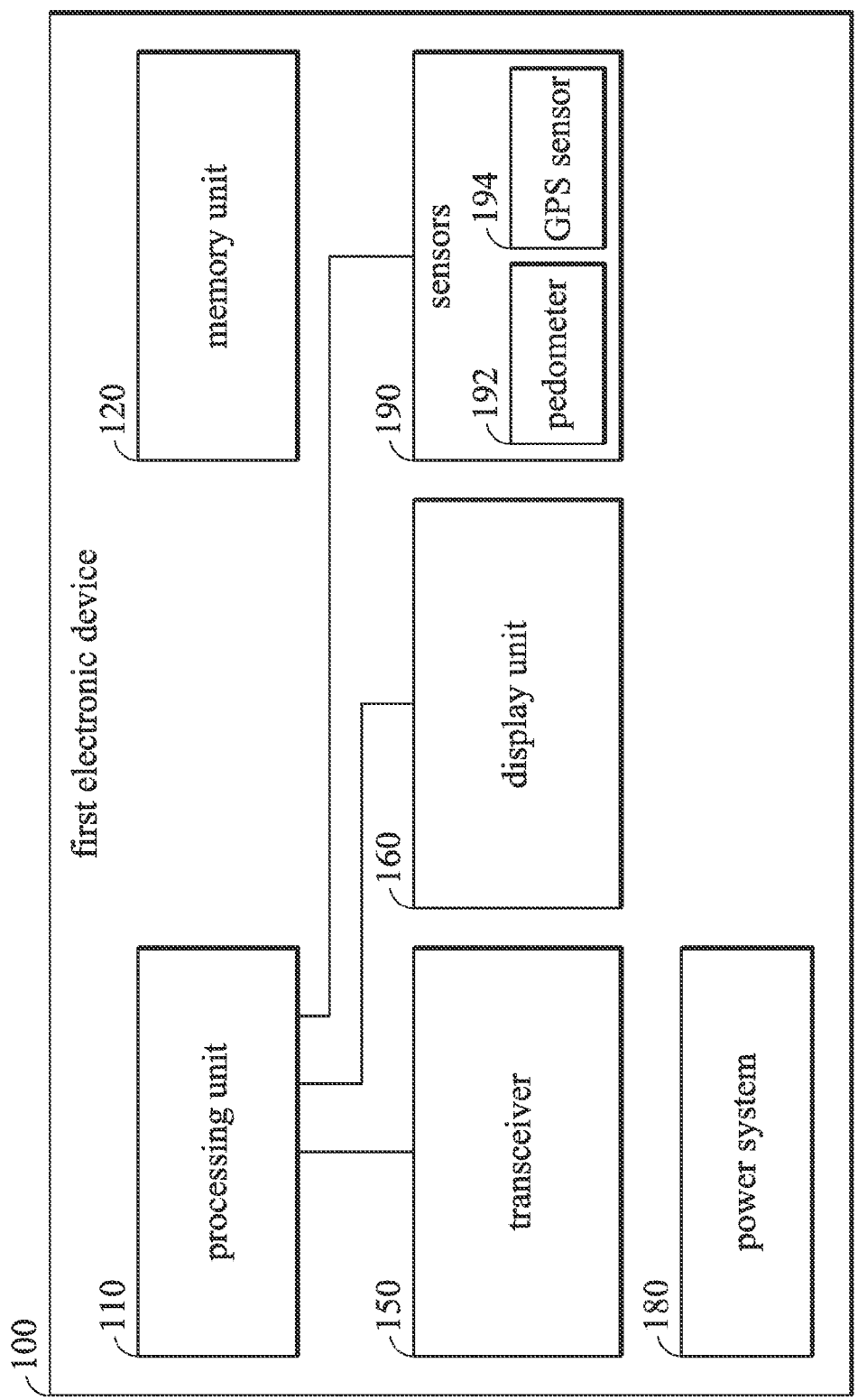
FIG. 2 is a block diagram illustrating a wearable device in accordance with an embodiment of the invention.

FIG. 2 is a block diagram illustrating the first electronic device 100 in accordance with an embodiment of the invention. The first electronic device 100 comprises a processing unit 110, a memory unit 120, a transceiver 150, a display unit 160, a power system 180 and one or more sensors 190. The processing unit 110 may include one or more processors and/or microcontrollers (MCU). The memory unit 120 may be applied as a main memory for the processing unit 110 for executing software routines and other selective storage functions. For example, the memory unit 120 may comprise a non-volatile memory and a volatile memory (not shown in FIG. 1). The non-volatile memory is capable of holding instructions and data without power and may store the software routines for controlling the first electronic device 100 in the form of computer-readable program instructions. The non-volatile memory (e.g. flash memory, ROM, etc.) may also contain a user interface application, which provides functionality for the first electronic device 100 and can output a graphical user interface on the display unit 160, which may be a touch-sensitive display (i.e. a "touch screen").

The transceiver 150 is configured to connect the first electronic device 100 to a remote electronic device (e.g. the second electronic device 200) via a wireless communication protocol, and transmitting/receiving packet data during the connection. For example, the BLE or NFC protocols are supported by the transceiver, but the invention is not limited thereto.

The power system 180 is configured to power the various components of the first electronic device 100. The power system 180 may include a power management system, one or more power sources (e.g., battery, alternating current (AC), a recharging system, a power failure detection circuit, a power converter or inverter, a power status indicator (e.g. a light-emitting diode (LED)) and any other components associated with the generation, management, and distribution of power in the first electronic device 100.

The sensors 190, which may include a pedometer 192 and a global positioning system (GPS) sensor 194, couples to the processing unit 110. In an embodiment, the pedometer 192 is configured to count each step a person takes by detecting the motion of the person's hips, and the pedometer 192 may be implemented by using micro-electro mechanical system (MEMS) inertial sensors such as an accelerometer, a gyroscope, and/or a magnetometer (not shown).

Figure 3:
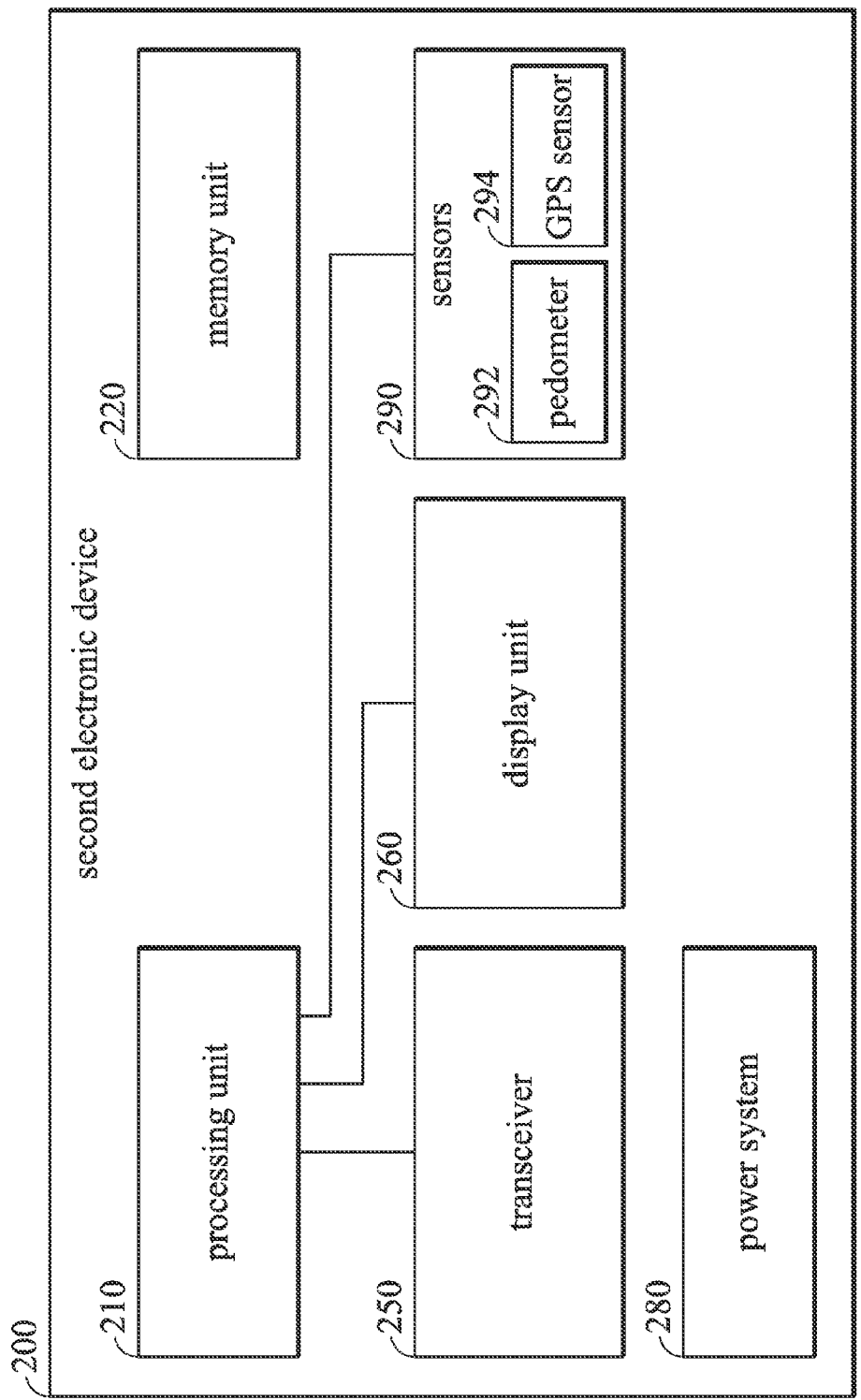
FIG. 3 is a block diagram of the second electronic device in accordance with an embodiment of the invention.

FIG. 3 is a block diagram of the second electronic device 200 in accordance with an embodiment of the invention. As illustrated in FIG. 3, the second electronic device 200 may comprise a processing unit 210, a memory unit 220, a transceiver 250, a display unit 260, a power system 280, a plurality of sensors 290. For example, the second electronic device 200 may be a smart watch or a smart wristband, and the second electronic device 2000 may further include a strap, a wristband, or a bracelet (not shown in FIG. 2). Alternatively, the second electronic device 200 may be a pair of smart glasses, and the second electronic device 200 may further include a spectacle frame and optical lenses (not shown in FIG. 2). Alternatively, the second electronic device 200 may be eyewear with a head-up display (HUD). Thus, the second electronic device 200 may be in any form of wearable accessories, and the invention is not limited to the aforementioned wearable devices. For example, the second electronic device 200 can be wearable on a user's wrist, upper arm, and/or leg, or may be attached to the user's clothing, and may have the functions of a wristwatch, a wearable display, a portable media player, and/or a mobile phone. It should be noted that the second electronic device 200 may be a wearable electronic device, and thus the battery capacity of the second electronic device 200 is very limited when compared with that of the first electronic device 100. Accordingly, the control of power consumption for the second electronic device 200 is very crucial.

Figure 4:
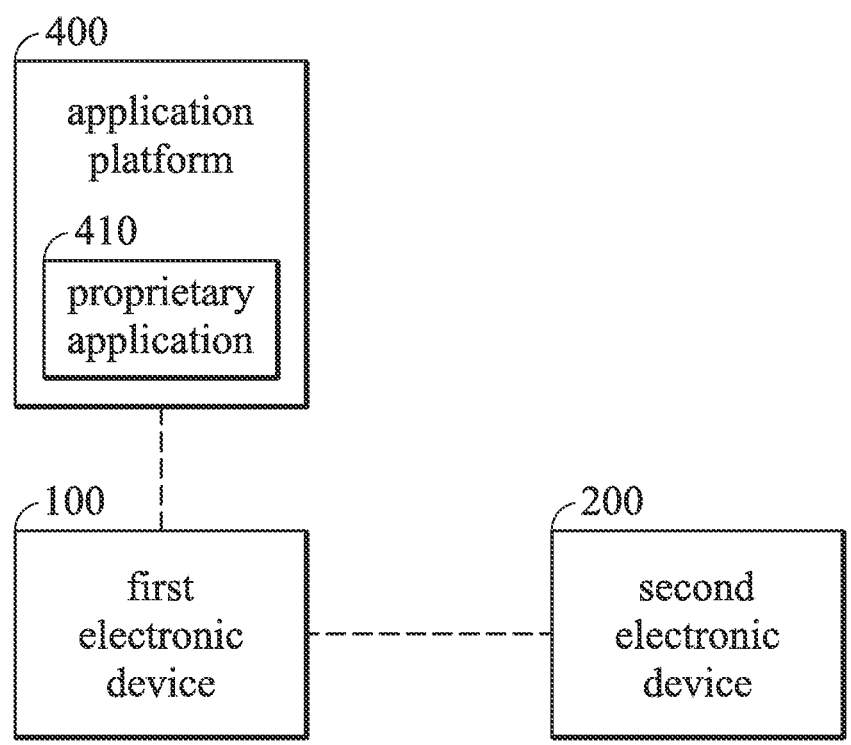
FIG. 4 is a diagram illustrating installation of a proprietary application on the first electronic device and the second electronic device in accordance with an embodiment of the invention.

FIG. 4 is a diagram illustrating installation of a proprietary application 410 on the first electronic device 100 and the second electronic device 200 in accordance with an embodiment of the invention. As illustrated in FIG. 4, a proprietary application 410 for monitoring the connection and controlling synchronization between the first electronic device 100 and the second electronic device 200 may be provided by an application source server or an application platform 400 (e.g. Google Play Store). The proprietary application 410 may include two sub-applications in a pair, and one of the sub-applications can be installed on the first electronic device 100, and the other one can be installed on the second electronic device 200. Alternatively, the same proprietary application 410 can be installed on both the first electronic device 100 and the second electronic device 200.

In this embodiment, the proprietary application 410 is downloaded from the application platform 400 by the first electronic device 100, and the proprietary application 410 is installed on the first electronic device 100. Afterwards, a synchronization operation between the first electronic device 100 and the second electronic device 200 is performed through the BLE protocol. Then, the proprietary application 410 or the associated sub-application can be retrieved from the first electronic device 100 by the second electronic device 200. Accordingly, the proprietary application 410 or the associated sub-application can be installed on the second electronic device 200, and the first electronic device 100 and the second electronic device 200 may have the same proprietary application 410 for the remote sensor function. During synchronization, the second electronic device 200 (e.g. a wearable device) may play the role of a master device, and the first electronic device 100 (e.g. a smartphone) may play the role of a slave device (details will be described later).

Figure 5A:
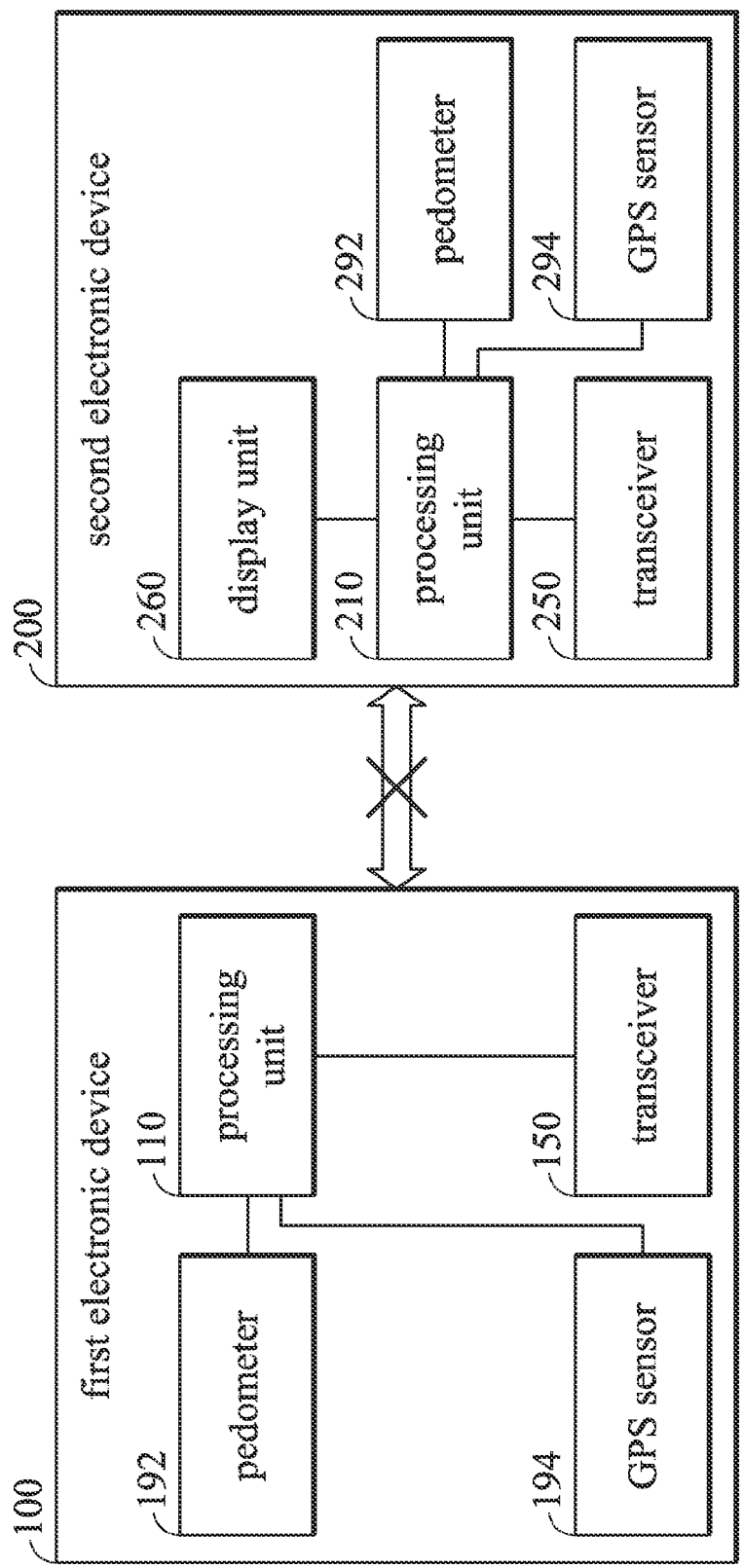
FIG. 5A is a diagram illustrating the common operation mode of the second electronic device during the synchronization in accordance with an embodiment of the invention.
Figure 5B:
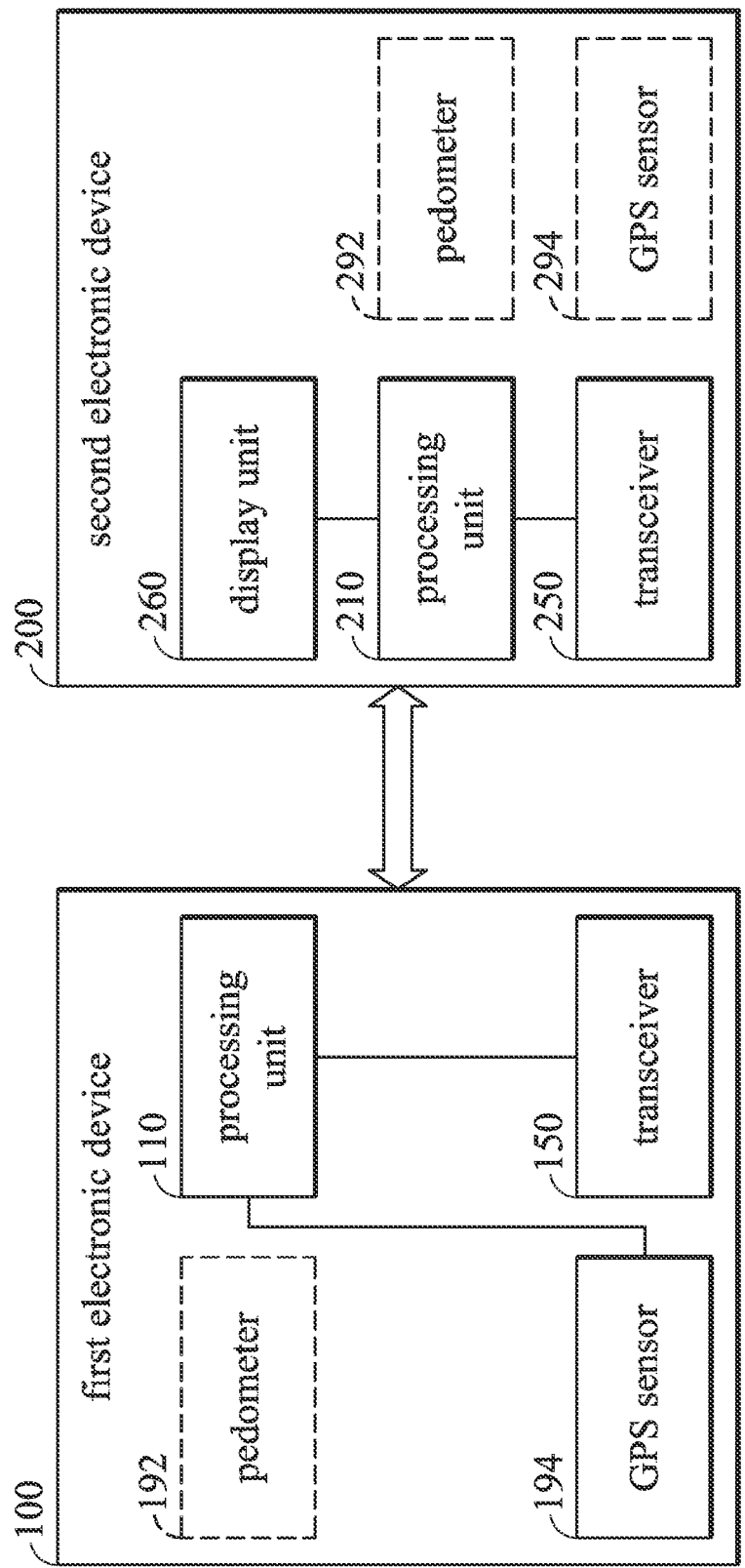
FIG. 5B is a diagram illustrating the remote sensor mode during the synchronization in accordance with an embodiment of the invention.

FIG. 5A is a diagram illustrating the common operation mode of the second electronic device 200 during the synchronization in accordance with an embodiment of the invention. FIG. 5B is a diagram illustrating the remote sensor mode during the synchronization in accordance with an embodiment of the invention. Referring to FIG. 5A, the second electronic device 200 may utilize its own pedometer 292 and GPS sensor 294 in some conditions such as (1) the second electronic device 200 is used as a standalone; (2) the connection between the first electronic device 100 and the second electronic device 200 is not established, e.g. the second electronic device 200 does not accept the connection request, or the connection is terminated by the first electronic device 100 or the second electronic device 200; or (3) the signal strength of the connection between the first electronic device 100 and the second electronic device 200 is weak.

Referring to FIG. 5B, when the signal strength of the connection is good enough and the first electronic device 100 accepts the request for sensor data sharing from the second electronic device 200, the connection between the first electronic device 100 and the second electronic device 200 is established. Afterwards, if the application executed by the second electronic device 200 only needs the GPS sensor data, the first electronic device 100 may start to share sensor data associated with the GPS sensor 194 with the second electronic device 200. The second electronic device 200 receives the sensor data from the first electronic device 100 via the transceiver 250 using the BLE connection. Because the same proprietary application (or sub-applications in a pair) is installed on both the first electronic device 100 and the second electronic device 200, the second electronic device 200 may fully utilize the received sensor data from the first electronic device 100 in the proprietary application as using its own sensor data associated with the pedometer 292 and/or GPS sensor 294. In an embodiment, the sensor data from the first electronic device 100 may be raw data sensed by the sensors 190. Alternatively, the sensor data from the first electronic device 100 may be context information, such as time information, geographical information, and/or semantic information, of the first electronic device 100. For example, the first electronic device 100 may execute a context-aware application to determine the context information (e.g. the user's activity, such as "at home") based on the raw data from the sensors 190. Since the second electronic device 200 is close to the first electronic device 100 while the connection has been established, the second electronic device 200 may directly use the context information from the first electronic device 100. Alternatively, the sensor data from the first electronic device 100 indicates content by processing the raw data sensed by the sensors 190.

In other words, the second electronic device 200 may use the remote sensor data from other electronic device synchronized with the second electronic device 200. Preferably, the transmission of the sensor data from the first electronic device 100 to the second electronic device 200 is via a low-power link, e.g. BLE.

Figure 6A:
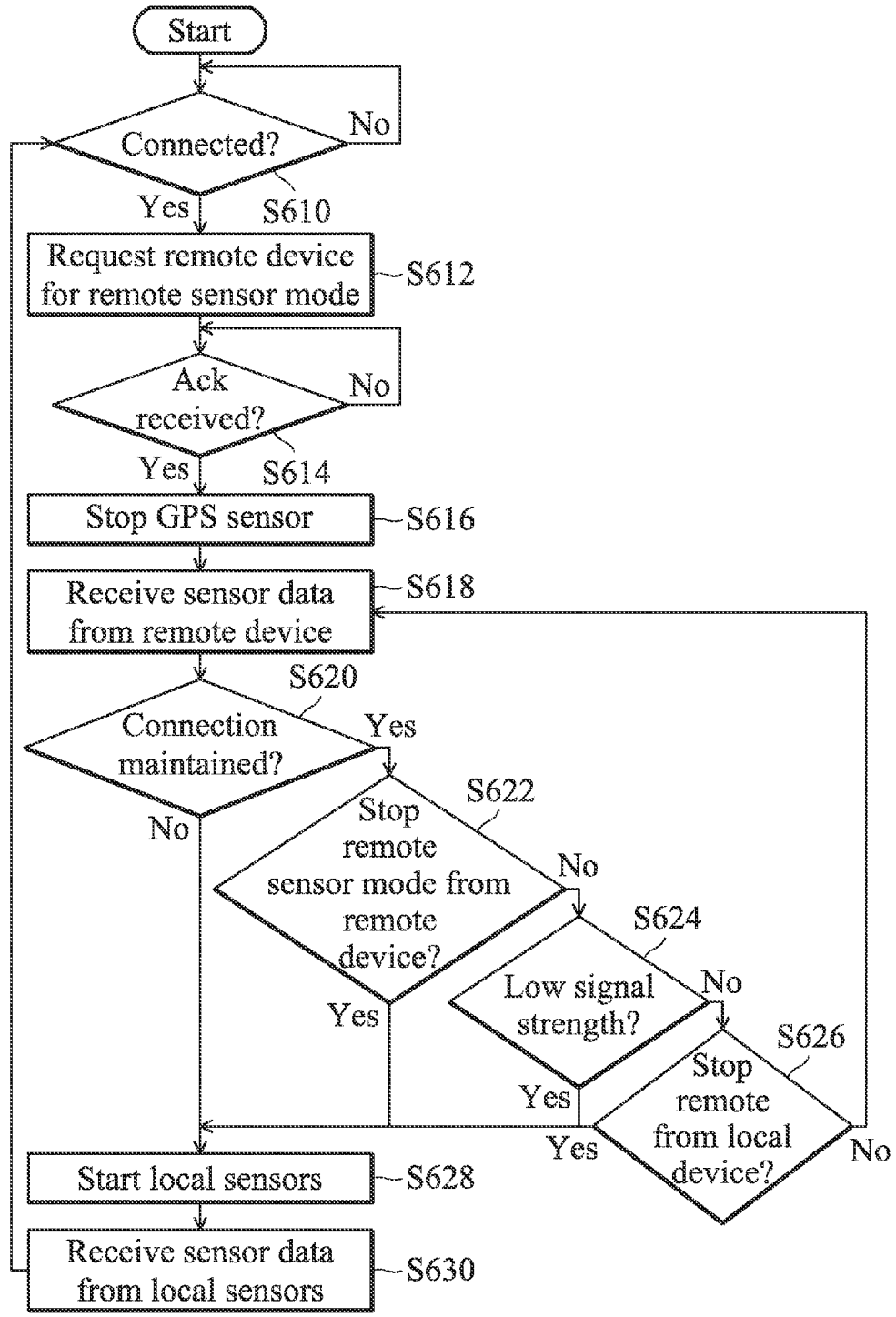
FIG. 6A is a flow chart illustrating the initialization procedure to enter a remote sensor mode by the second electronic device in accordance with an embodiment of the invention.

FIG. 6A is a flow chart illustrating an initialization procedure to enter a remote sensor mode by the second electronic device 200 in accordance with an embodiment of the invention. The second electronic device 200 may initialize the synchronization connection as a master device. In step S610, the second electronic device 200 may check whether the connection between the first electronic device 100 and the second electronic device 200 has been established. If so, step S612 is performed. If not, step S610 is performed. In step S612, the second electronic device 200 may send a request signal to the first electronic device 100 to ask to share its sensor data. In step S614, the second electronic device 200 may determine whether an acknowledgment signal from the first electronic device 100 is received. If so, step S616 is performed. If not, step S614 is performed.

In step S616, the second electronic device 200 stops the GPS sensor 294 and/or the pedometer 192 in response to the acknowledgment signal. Then, the second electronic device 200 enters the remote sensor mode as a master device and starts to receive the sensor data from the first electronic device (step S618). Afterwards, the second electronic device 200 further determines when to stop receiving the sensor data from the first electronic device 100. For example, in step S620, the second electronic device 200 determines whether the connection is still maintained. If so, step S622 is performed. If not, step S628 is performed. In step S622, the second electronic device 200 further determines whether a connection termination signal is received from the first electronic device 100. If so, step S628 is performed. If not, step S624 is performed.

In step S624, the second electronic device 200 further determines whether the signal strength of the connection is weak, e.g. the signal strength is lower than a predetermined threshold. If so, step S628 is performed. If not, step S626 is performed. In step S626, the second electronic device 200 further determines whether the connection for remote sensor data sharing is terminated locally on the second electronic device 200, e.g. via a software/hardware button. If so, step S628 is performed. If not, step S618 is performed. In step S628, the second electronic device 200 may exit the remote sensor mode, and activate the previously turned-off pedometer 292 and/or GPS sensor 294, and start to utilize the sensor data from the pedometer 292 and/or GPS sensor 294 (step S630). Afterwards, step S610 is performed, and the processing unit 210 of the second electronic device 200 may determine whether the connection between the first electronic device 100 and the second electronic device 200 has been established. It should be noted that the order of steps S620~S626 is not limited to the aforementioned embodiment, and the order of steps S620~S626 can be exchanged.

Figure 6B:
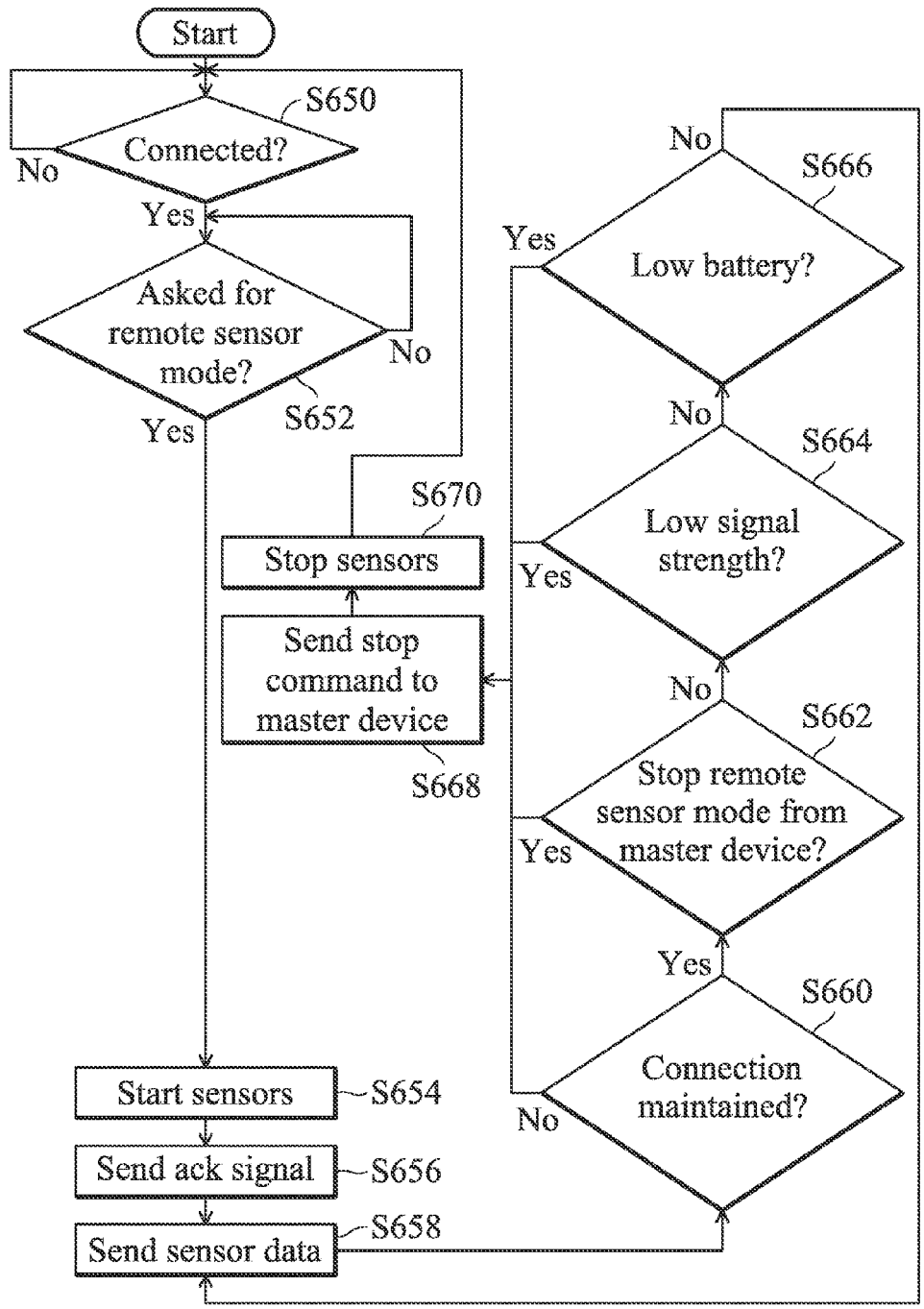
FIG. 6B is a flow chart illustrating the initialization procedure to enter a remote sensor mode by the first electronic device in accordance with an embodiment of the invention.

FIG. 6B is a flow chart illustrating the initialization procedure to enter a remote sensor mode by the first electronic device 100 in accordance with an embodiment of the invention. In step S650, the first electronic device 100 may determine whether the connection between the first electronic device 100 and the second electronic device 200 has been established. If so, step S652 is performed. If not, step S650 is performed. In step S652, the first electronic device 100 may determine whether the first electronic device 100 has been asked for the sensor data by the second electronic device 200. If so, step S654 is performed. If not, step S652 is performed. In step S654, the first electronic device 100 may activate the pedometer 192 and/or the GPS sensor 194, and then send an acknowledgment signal to the second electronic device 200 (step S656), thereby establishing the connection. After the connection between the first electronic device 100 and the second electronic device 200 has been established, the first electronic device 100 may enter the remote sensor mode as a slave device and start to send the sensor data from the pedometer 192 and/or the GPS sensor 194 to the second electronic device 200, e.g. via BLE protocol (step S658).

While sending the sensor data to the second electronic device 200, the first electronic device 100 may further determine whether to stop sending the sensor data occurs. For example, in step S660, the first electronic device 100 may determine whether the connection between the first electronic device 100 and the second electronic device 200 is maintained. If so, step S662 is performed. If not, step S668 is performed. In step S662, the first electronic device 100 may further determine whether a request signal to turn off the remote sensor mode is received from the second electronic device 200 (e.g. associated with step S626 in FIG. 6A). If so, step S668 is performed. If not, step S664 is performed. In step S664, the first electronic device 100 may further determine whether the signal strength of the connection is low, e.g. the signal strength is lower than a predetermined threshold. If so, step S668 is performed. If not, step S666 is performed. In step S666, the first electronic device 100 may further determine whether the remaining battery capacity of the first electronic device 100 is lower than a predefined threshold, e.g. 10% battery capacity. If so, step S668 is performed. If not, step S658 is performed to keep sending sensor data to the second electronic device 200.

In step S668, the first electronic device 100 may send a stop command to the second electronic device 200. In step S670, the first electronic device 100 may exit the remote sensor mode and turn off the pedometer 192 and/or the GPS sensor 194. Afterwards, step S650 is performed to check whether the connection between the first electronic device 100 and the second electronic device 200 has been established.

Figure 7:
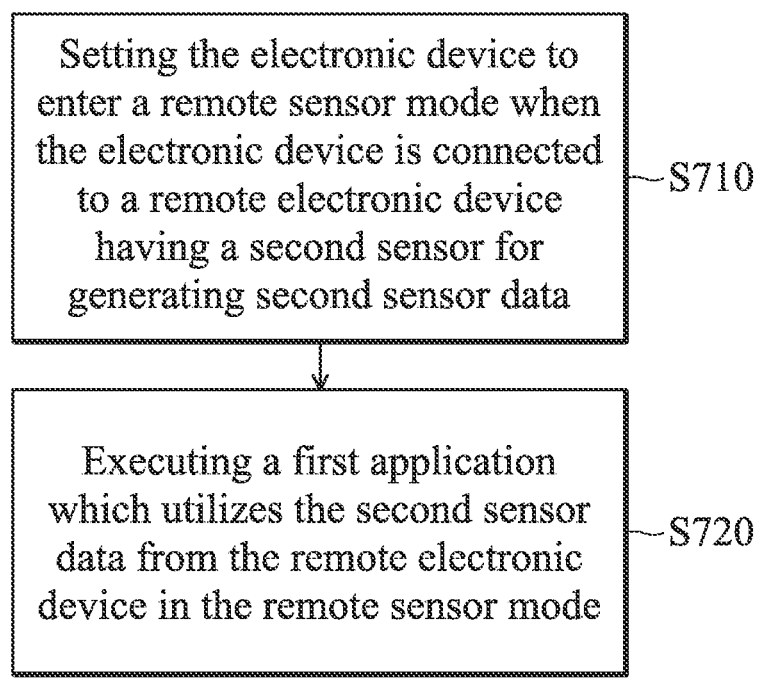
FIG. 7 is a flow chart of a remote data sharing method in accordance with an embodiment of the invention.

FIG. 7 is a flow chart of a remote data sharing method in accordance with an embodiment of the invention. In step S710, the second electronic device 200 enters a remote sensor mode when the second electronic device 200 is connected to a remote electronic device (e.g. the first electronic device 100) having at least one second sensor. In step S720, the second electronic device 200 executes a first application which utilizes second sensor data from the remote electronic device (e.g. from the pedometer 192 and/or the GPS sensor 194 of the first electronic device 100) instead of the first sensor data (e.g. from the pedometer 292 and/or GPS sensor 294) in the remote sensor mode. It should be noted that the second electronic device 200 may turn-off the pedometer 292 and/or GPS sensor 294 when entering the remote sensor mode. Both the first electronic device 100 and the second electronic device 200 may keep monitoring whether to exit the remote sensor mode (e.g. steps S620~S626 in FIG. 6A, and steps S660~S666 in FIG. 6B).

Figure 8:
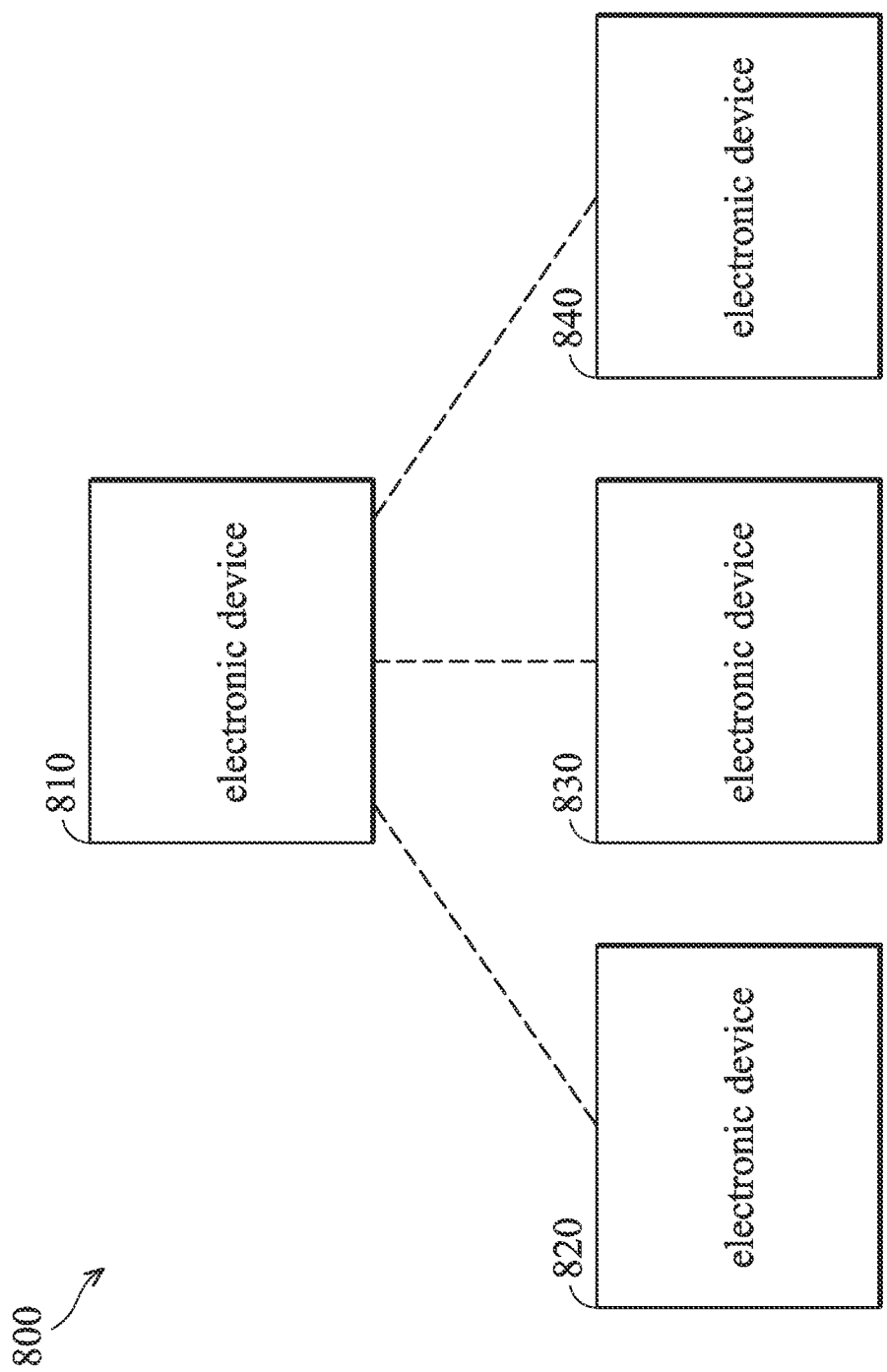
FIG. 8 is a diagram of an electronic system in accordance with an embodiment of the invention.

FIG. 8 is a diagram of an electronic system in accordance with an embodiment of the invention. In an embodiment, the electronic system 800 comprises a plurality of electronic devices such as electronic devices 810~840. The electronic device 810 may possess a rich battery capacity, such as a smartphone or a tablet PC. The electronic devices 820, 830 and 840 may possess a very limited battery capacity (i.e. compared with the electronic device 810) such as a smart watch, a smart wristband, smart glasses, or any other type of wearable device. Alternatively, the electronic devices 810, 820, 830, and 840 may be any type of mobile device, portable device, and/or wearable device. For example, the electronic devices 820~840 can be wearable on a user's wrist, upper arm, and/or leg, or may be attached to the user's clothing, and may have the functions of a wristwatch, a wearable display, a portable media player, and/or a mobile phone. In addition, the electronic devices 820~840 can be connected to or paired with the electronic device 810 via a low-power wireless communication protocol such as Bluetooth low energy (BLE) or near field communication (NFC).

Figure 9:
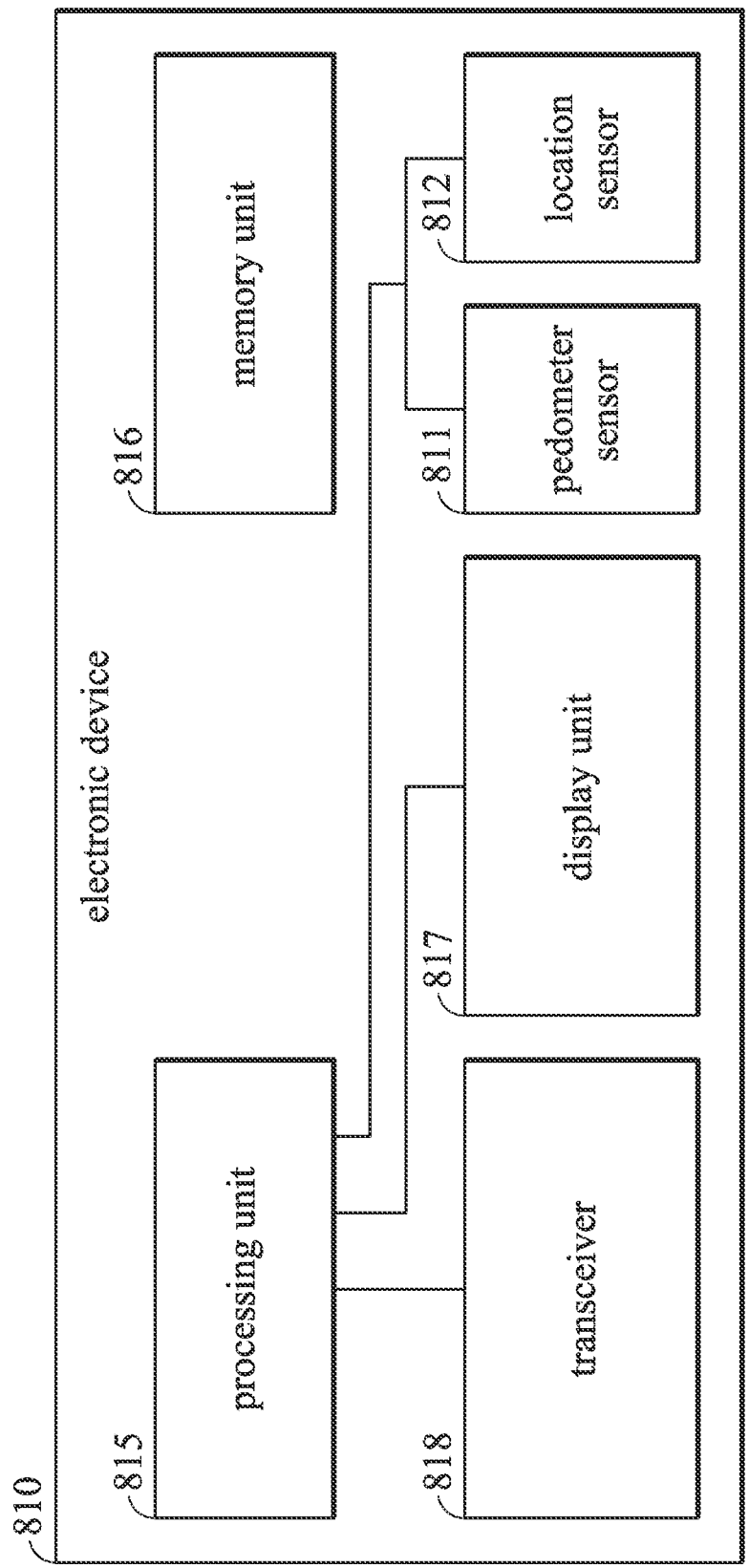
FIG. 9 is a block diagram of the electronic device 810 in accordance with an embodiment of the invention.

FIG. 9 is a block diagram of the electronic device 810 in accordance with an embodiment of the invention. The electronic device 810 comprises a pedometer sensor 811, a location sensor 812, a processing unit 815, a memory unit 816, a display unit 817, and a transceiver 818. The memory unit 816 may include a volatile memory and a nonvolatile memory (not shown). The memory unit 816 may be utilized as the main memory for the processing unit 815 for executing software routines and other selective storage functions. The non-volatile memory is capable of holding instructions and data without power and may store the software routines and applications for controlling the electronic device 810 in the form of computer-readable program instructions. The non-volatile memory may also contain a user interface program, which provides functionality for the electronic device 810 and can output the graphical user interface on the display unit 817, which may be a touch screen. The pedometer sensor 811 generates step count and estimates the distance that the user has walked, and the pedometer 811 may be implemented by using micro-electro mechanical system (MEMS) inertial sensors such as an accelerometer, a gyroscope, and/or a magnetometer (not shown). The location sensor 812 detects the location of the electronic device 810 and generates associated location data. The processing unit 815 comprises one or more processors, digital signal processors (DSP), or microcontrollers (MCU), but the invention is not limited thereto.

The transceiver 818 is configured to connect the electronic device 810 to a remote external electronic device, e.g. the electronic devices 120, 130 and 140, via a wireless communication protocol, and transmitting/receiving packet data during the connection. For example, the BLE or NFC protocols are supported by the transceiver, but the invention is not limited thereto.

It should be noted that the architecture of the electronic devices 820~840 in FIG. 8 may be similar to that of the electronic device 810, but the implementation may vary based on different usage of the electronic devices 820~840, e.g. smart wristband, smart watch, smart glasses . . . etc. For example, when the electronic device 830 is a smart wristband and the system resources and the battery capacity are very limited, low-power components are used by the electronic device 830. One having ordinary skill in the art will appreciate how to implement the aforementioned components into various kinds of electronic devices, and the details will be omitted here.

Figure 10A:
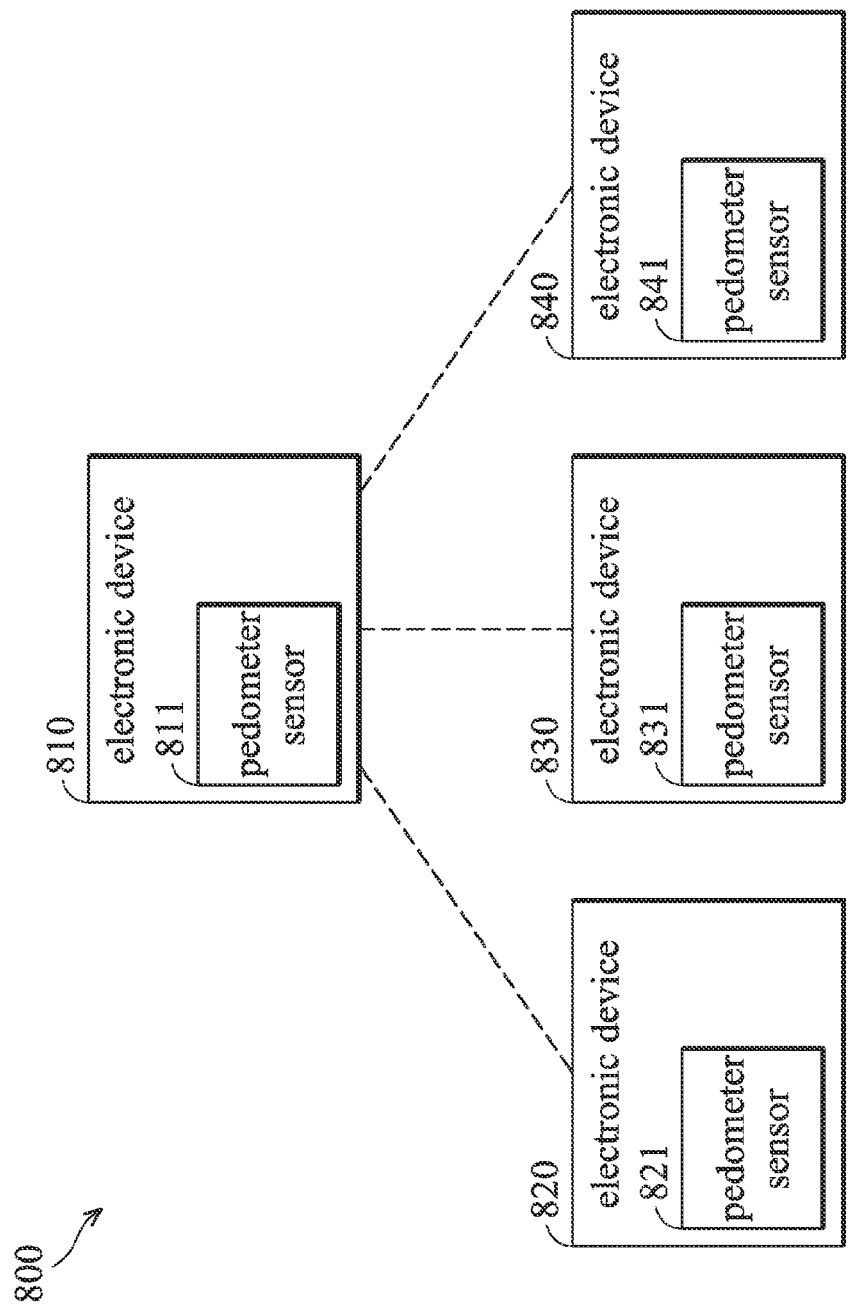
FIG. 10A is a diagram of the electronic system 800 in accordance with an embodiment of the invention.

FIG. 10A is a diagram of the electronic system 800 in accordance with an embodiment of the invention. In a scenario, all the electronic devices 810~840 are carried or used by a user, and the electronic devices 820~840 have been paired with the electronic device 810. For example, the electronic device 810 is a smartphone, and the electronic devices 820, 830, and 840 are a first smart watch, a smart wristband, and a second smart watch, respectively. It should be noted that pedometer sensors 811, 821, 831, and 841 are deployed on each of the electronic devices 810, 820, 830, and 840 for generating a step count and estimating a walking distance, respectively. The electronic device 810 acts as a resource manager communicating between the electronic devices 820~840. Since the electronic devices 810~840 are carried by the same user, the pedometer sensors on the electronic devices 810~840 may obtain similar sensor data, and thus some of the gathered sensor data are redundant. In other words, it wastes battery power to gather redundant sensor data when all the pedometer sensors of the electronic devices 810~840 are activated simultaneously. The user may manually turn off unnecessary pedometer sensors via the resource manager, i.e. the electronic device 810. For example, the user may turn off the pedometer sensors 821 and 841 of the electronic devices 820 and 840 via the electronic device 810. In other words, only the pedometer sensors 811 and 831 of the electronic device 810 and 830, i.e. the smartphone and the smart wristband, are activated to gather sensor data, thereby reducing the overall power consumption of the electronic system 800.

Figure 10B:
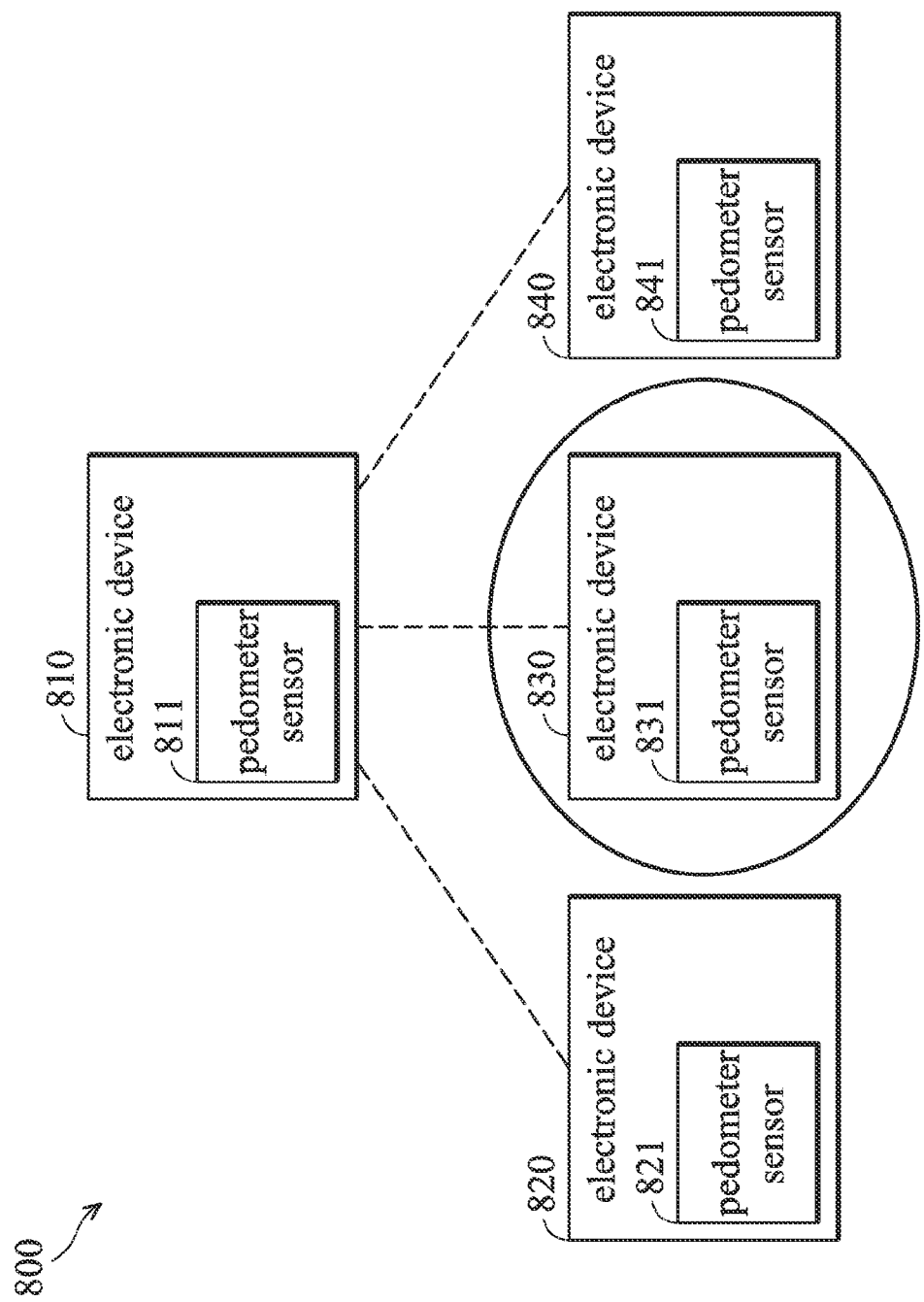
FIG. 10B is a diagram of the electronic system 800 in accordance with an embodiment of the invention.

FIG. 10B is a diagram of the electronic system 800 in accordance with an embodiment of the invention. Furthermore, the features or specification of each of the pedometers deployed on the electronic devices 810~840 may be different. For example, the pedometer sensors 811, 821, 831, and 841 may be different in quality (e.g. accuracy rating), power consumption, reliability, or longevity, and the remaining battery levels of the electronic devices may also be different. Alternatively, the resource manager, e.g. the electronic device 810, may retrieve the feature information from the connected electronic devices 820~840, and thus the user may know all the retrieved features of the pedometer sensors 811, 821, 831 and the remaining battery levels of the electronic devices 810~840 in the electronic system 800. Subsequently, the user may select the most appropriate pedometer sensor on one of the electronic devices 820~840 to gather sensor data via the electronic device 810 according to the retrieved features of the pedometer. Specifically, the user may use his smartphone, e.g. electronic device 810, as a resource manager, and activate the pedometer sensors deployed on one or more of the external electronic devices, e.g. electronic device 820~840, to gather sensor data.

For example, the pedometer sensor 811 has an accuracy rating of 60% and the remaining battery level of the electronic device 810 is 90%, and the pedometer sensor 821 has an accuracy rating of 80% and the remaining battery level of the electronic device 820 is 50%, and the pedometer sensor 831 has an accuracy rating of 90%° and the remaining battery level of the electronic device 130 is 80%, and the pedometer sensor 841 has an accuracy rating of 70% and the remaining battery level of the electronic device 840 is 20%. The electronic device 810 gathers information about the accuracy rating of the pedometer sensors and the remaining battery level from itself and the external electronic devices 820~840. The pedometer sensor 831 deployed on the electronic device 830, e.g. a smart wristband, has the highest accuracy rating than the pedometer sensors deployed on other electronic devices, and the remaining battery level of the electronic device 830 is still at a relatively high level (e.g. 80%).

In the first embodiment, when a "balance" configuration (i.e. considering both the accuracy rating and usage time) is applied, the electronic device 810 may analyze the information gathered and determine that only the pedometer sensor 831 is to be activated for gathering sensor data and other pedometer sensors are to be turned off, where the circle indicates the electronic device 830 having an activated pedometer sensor 831, as shown in FIG. 10B. Then, the electronic device 810 may retrieve the sensor data gathered by the pedometer sensor 831 through the electronic device 830, thereby achieving better sensor quality and longer usage time. Alternatively, the user may also determine which pedometer sensor is to be activated via the electronic device 810 based on the gathered information.

In the second embodiment, when a power-saving configuration is applied, the electronic device 810 may analyze the information gathered and determine which pedometer sensor can operate for the longest time. For example, the electronic device 810 may estimate the usage time of each pedometer sensor by dividing the remaining battery level or allocated battery level for the pedometer with the power consumption of each pedometer sensor. Thus, the electronic device 810 determines that the pedometer sensor 831 is to be activated for gathering sensor data and other pedometer sensors are to be turned off as shown in FIG. 10B. It should be noted that the electronic device 810 may still determine that the pedometer 831 of the electronic device 830 is to be activated although different configurations and strategies are used in the first and second embodiments.

Figure 10C:
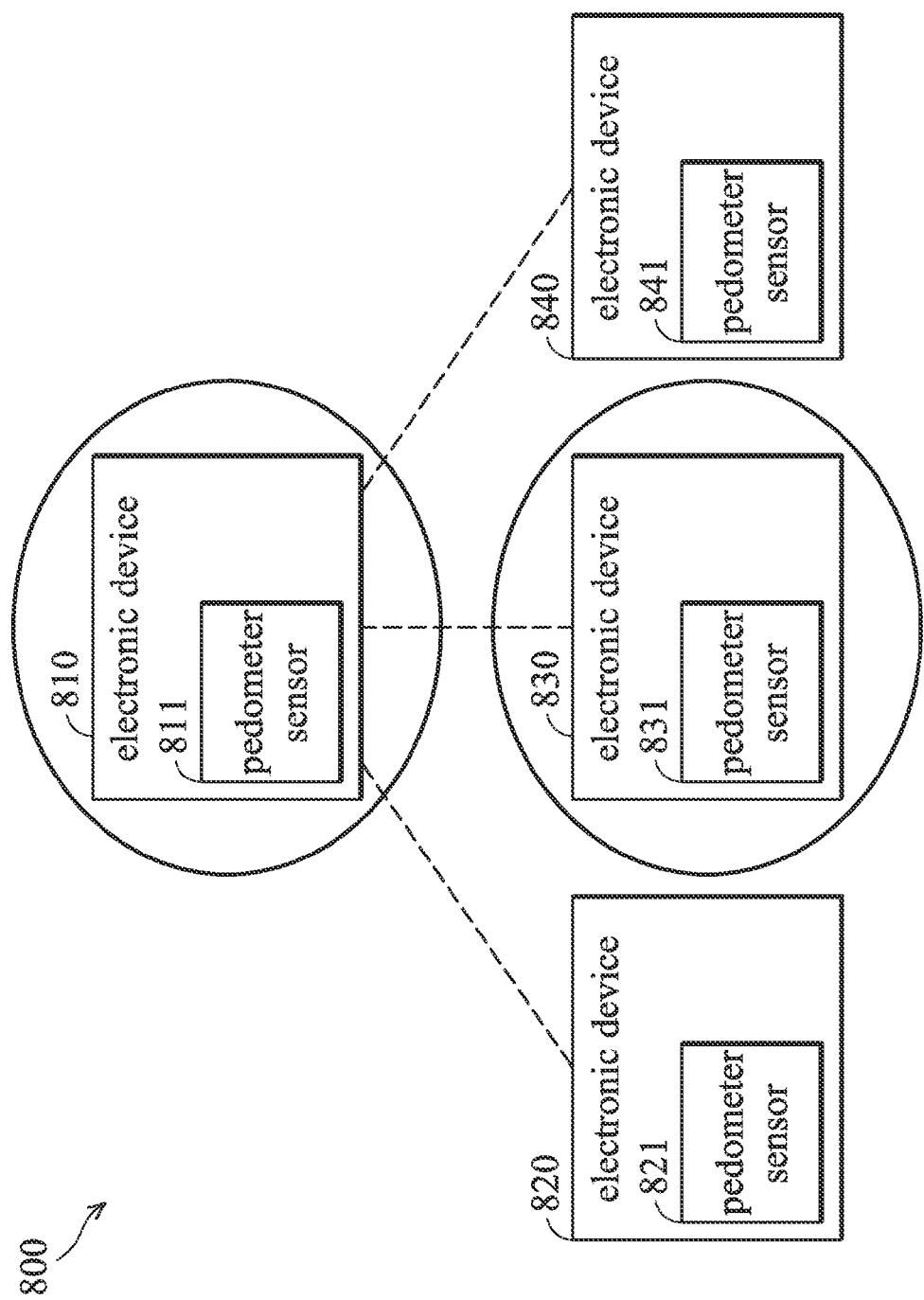
FIG. 10C is a diagram of the electronic system 800 in accordance with another embodiment of the invention.

FIG. 10C is a diagram of the electronic system 800 in accordance with another embodiment of the invention. In the third embodiment, when a "sensor-quality" configuration is applied, the electronic device 810 may determine the pedometer sensors to be activated based on the accuracy rating of each pedometer sensor and the remaining battery level of each electronic device. It should be noted that the sensor data gathered by different pedometer sensors can be "fused" (i.e. combined) to achieve a higher accuracy rating. For example, the electronic device 810 may analyze the information gathered regarding the accuracy rating from itself and connected electronic device 820~840, and determine that the pedometer sensors 811 and 831 are to be activated for gathering sensor data, where the circles indicate the electronic devices having an activated pedometer sensor, as shown in FIG. 10C. Then, the electronic device 810 may combine the sensor data from the pedometer sensors 811 and 831 to generate refined sensor data with a higher accuracy.

Figure 10D:
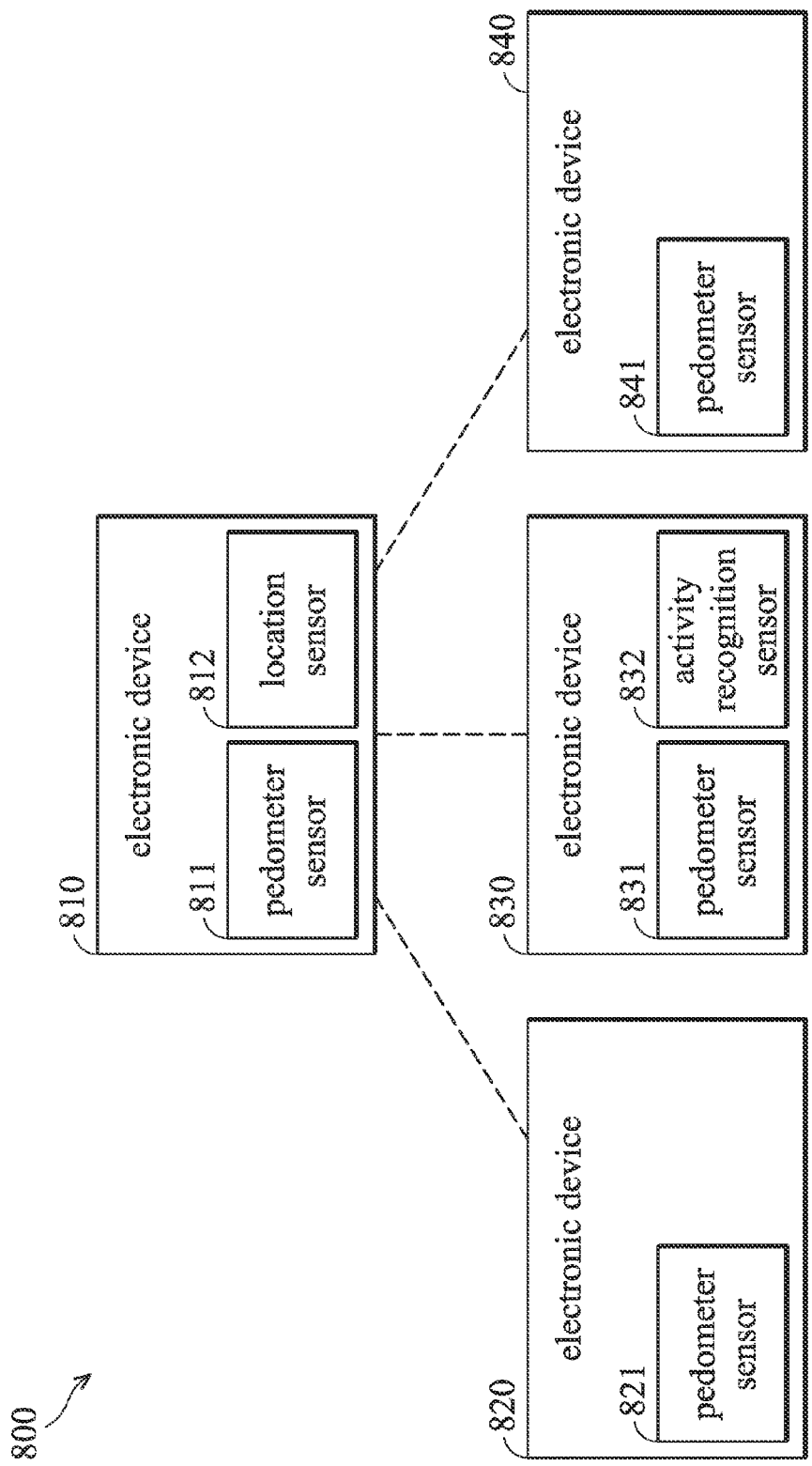
FIG. 10D is a diagram of the electronic system 800 in accordance with another embodiment of the invention.

FIG. 10D is a diagram of the electronic system 800 in accordance with another embodiment of the invention. In the fourth embodiment, the electronic device 830 further comprises an activity recognition sensor 832 for gathering sensor data about the activities of the electronic device 830, and the electronic device 810 further comprises a location sensor 812 for detecting the location of the electronic device 810. In addition, the resource manager, e.g. the electronic device 810, may turn on or off the sensors of the external electronic devices 820~840 for saving power according to the sensor data provided by the sensors of the external electronic devices 820~840, e.g. the activity recognition sensor 832 of the electronic device 830. In this embodiment, the electronic device 110 activates the pedometer sensor 111 and the location sensor 812 of the electronic device 810, and activates the activity recognition sensor 832 of the electronic device 830. For example, the electronic device 810 gathers the sensor data from the activity recognition sensor 832 through the electronic device 830, and detects the user's activity, such as standing still, walking, riding in a vehicle, etc., according to the sensor data gathered. When the electronic device 810 determines that the user is stationary according to the sensor data from the activity recognition sensor 832, it indicates that the location sensor 812 is temporarily not required, and the electronic device 810 may turn off the location sensor 812 and the pedometer sensor 811. When the electronic device 810 determines according to the sensor data from the activity recognition sensor 832 that the user is moving, the electronic device 810 may activate the location sensor 812 and the pedometer sensor 811.

Figure 11:
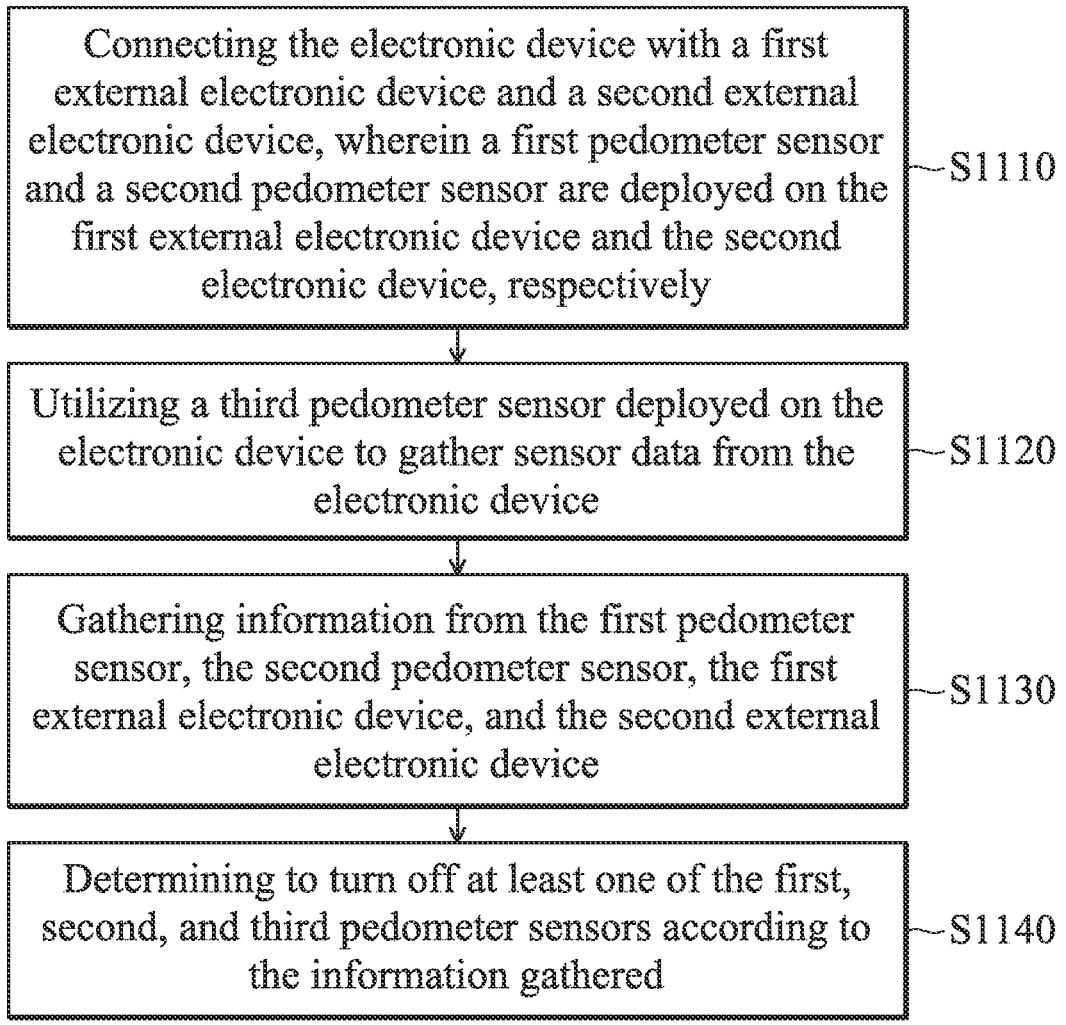
FIG. 11 is a flow chart of a power-saving method for use in an electronic device in accordance with an embodiment of the invention.

FIG. 11 is a flow chart of a power-saving method for use in an electronic device in accordance with an embodiment of the invention. In step S1110, the electronic device 810 is connected with a first external electronic device (e.g. electronic device 820) and a second external electronic device (e.g. electronic device 830). In an embodiment, the electronic device 810, the first external electronic device, and the second external electronic device are carried by a user, and a first sensor (e.g. pedometer sensor 821) and a second sensor (e.g. pedometer sensor 831) are deployed on the first external electronic device and the second external electronic device, respectively. In step S1120, a third sensor (e.g. pedometer sensor 811) deployed on the electronic device 810 gathers sensor data from the electronic device 810. It should be noted that the first, second, and third sensor have the same type (e.g. pedometer sensors, but not limited).

In step S1130, information is gathered from the first pedometer sensor and the second pedometer sensor, the first external electronic device, and the second external electronic device. In step S1140, it is determined to turn off at least one of the first, second, and third sensors according to the information gathered.

In view of the above, a power-saving method and associated electronic device are provided. The power-saving method and the associated electronic device are capable of turning off unnecessary sensors on the electronic device and external electronic devices to reduce redundant data gathering or turning on necessary sensors on the electronic device and external electronic devices to enhance the accuracy of sensor data, thereby reducing overall power consumption and sustaining the sensor quality of the electronic system. The power-saving method and the associated electronic device are further capable of turning on necessary sensors on the electronic device and external electronic devices according to the detected activity of the user.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:
   a processor, for connecting the electronic device with a first external electronic device and a second external electronic device, wherein a first sensor and a second sensor are deployed on the first external electronic device and the second electronic device, respectively; and
   a third sensor for gathering sensor data from the electronic device,
   wherein the first sensor, the second sensor, and the third sensor have the same type,
   wherein the processor gathers information from the first sensor, the second sensor, the first external electronic device, and the second external electronic device, and determines whether to turn off at least one of the first, second, and third sensors according to the information gathered,
   wherein when a power-saving configuration is used, the processor activates one of the first, second, and third sensors having the longest battery life according to the information gathered and the remaining battery levels of the electronic device, the first external electronic device, and the second external electronic device.

2. The electronic device as claimed in claim 1, wherein the electronic device, the first external electronic device, and the second external electronic device are carried by a user.

3. The electronic device as claimed in claim 1, wherein the first sensor, the second sensor, and the third sensor are pedometer sensors.

4. The electronic device as claimed in claim 3, wherein the information gathered comprises accuracy rating, power consumption, and longevity of the first sensor and the second sensor, and remaining battery levels of the first external electronic device and the second external electronic device.

5. The electronic device as claimed in claim 1, wherein when a balance configuration is used, the processor turns on one of the first, second, and third sensors having the best accuracy rating and a longer battery life according to the information gathered and remaining battery levels of the electronic device, the first external electronic device, and the second external electronic device.

6. The electronic device as claimed in claim 1, wherein when a sensor-quality configuration is used, the processor activates one or more of the first, second, and third sensors having the longest battery life according to the information gathered and the remaining battery levels of the electronic device, the first external electronic device, and the second external electronic device, and combine the sensor data from the activated sensors to obtain refined sensor data.

7. The electronic device as claimed in claim 1, wherein the first external electronic device further comprises an activity recognition sensor for gathering activity sensor data of the first external electronic device, and the electronic device further comprises a location sensor for detecting location sensor data of the electronic device,
   wherein the processor retrieves the activity sensor data from the first external electronic device and determines whether the first external electronic device is stationary according to the retrieved activity sensor data,
   wherein the processor turns off the third sensor and the location sensor when the processor determines that the first external electronic device is stationary,
   wherein the processor activates the third sensor and the location sensor when the processor determines that the first external electronic device is moving.

8. A power-saving method for use in an electronic device, comprising:
   connecting the electronic device with a first external electronic device and a second external electronic device, wherein a first sensor and a second sensor are deployed on the first external electronic device and the second electronic device, respectively;
   utilizing a third sensor deployed on the electronic device for gathering sensor data from the electronic device;
   gathering information from the first sensor and the second sensor, the first external electronic device, and the second external electronic device;
   determining to turn off at least one of the first, second, and third sensors according to the information gathered; and
   when a power-saving configuration is used, activating one of the first, second, and third sensors having the longest battery life according to the information gathered and the remaining battery levels of the electronic device, the first external electronic device, and the second external electronic device.

9. The method as claimed in claim 8, wherein the electronic device, the first external electronic device, and the second external electronic device are carried by a user.

10. The method as claimed in claim 9, wherein the first sensor, the second sensor, and the third sensor are pedometer sensors.

11. The method as claimed in claim 10, wherein the information gathered comprises accuracy rating, power consumption, and longevity of the first sensor and the second sensor, and remaining battery levels of the first external electronic device and the second external electronic device.

12. The method as claimed in claim 8, further comprising:
    when a balance configuration is used, activating one of the first, second, and third sensors having the best accuracy rating and a longer battery life according to the information gathered and remaining battery levels of the electronic device, the first external electronic device, and the second external electronic device.

13. The method as claimed in claim 8, further comprising:
when a sensor-quality configuration is used, activating one or more of the first, second, and third sensors having the longest battery life according to the information gathered and the remaining battery levels of the electronic device, the first external electronic device, and the second external electronic device; and
combining the sensor data from the activated sensors to obtain refined sensor data.

14. The method as claimed in claim 8, wherein the first external electronic device further comprises an activity recognition sensor for gathering activity sensor data of the first external electronic device, and the electronic device further comprises a location sensor for detecting location sensor data of the electronic device, and the method further comprises:
retrieving the activity sensor data from the first external electronic device and determining whether the first external electronic device is stationary according to the retrieved activity sensor data;
turning off the third sensor and the location sensor when the processor determines that the first external electronic device is stationary; and
activating the third sensor and the location sensor when the processor determines that the first external electronic device is moving.

15. A power-saving method for use in an electronic device, comprising:
connecting the electronic device with a plurality of external electronic devices,
wherein the electronic device and the external electronic devices possess a plurality of sensors, respectively;
gathering information from the external electronic devices;
determining a configuration of the sensors according to the information gathered; and
when the determined configuration is a power-saving configuration, activating one of the pedometer sensors having the longest battery life according to the information gathered.

16. The method as claimed in claim 15, wherein the plurality of sensors are pedometer sensors.

17. The method as claimed in claim 15, wherein the information gathered comprises remaining battery levels of the external electronic devices, and allocated battery level associated with the pedometer sensors.

18. The method as claimed in claim 17, further comprising:
when the determined configuration is a balance configuration, activating one of the pedometer sensors having the best accuracy rating and a longer battery life according to the information gathered.

19. The method as claimed in claim 17, further comprising:
when the determined configuration is a sensor-quality configuration, activating one or more of the pedometer sensors having the longest battery life according to the information gathered; and
combining sensor data from the activated sensors to obtain refined sensor data.

* * * * *